March 31, 1964 R. E. SPANGENBERG 3,127,147
SUSPENSION DEVICE FOR A CEILING CARRIER
Filed Oct. 29, 1962

INVENTOR
Robbert Ernst Spangenberg

BY Stevens, Davis, Miller & Mosher
ATTORNEYS

United States Patent Office 3,127,147
Patented Mar. 31, 1964

3,127,147
SUSPENSION DEVICE FOR A CEILING CARRIER
Robbert Ernst Spangenberg, The Hague, Netherlands, assignor to Hunter Douglas International (Quebec) Limited, Montreal, Canada, a corporation of Quebec
Filed Oct. 29, 1962, Ser. No. 233,613
Claims priority, application Netherlands Nov. 3, 1961
4 Claims. (Cl. 248—327)

This invention relates to a suspension device for a ceiling carrier, in particular for an acoustic ceiling consisting of panels, comprising a strip-like element or some other elongated part, which is provided with take-up means such as holes, recesses, apertures and the like and a helically wound spring.

In consequence of the fact that with this suspension device the helically wound spring has a pitch which is substantially equal to the distance between two consecutive take-up means on the same side of the strip-like element this results in the disadvantage that on account of vibrations or shocks the spring screws farther or less far on or entirely out of the take-up means so that consequently the ceiling is not satisfactorily supported anymore.

The invention aims at avoiding this disadvantage which is accomplished by the suspension device according to the invention in that one or more windings of said spring have a smaller pitch than the pitch of the other windings, the pitch of said other windings substantially corresponding with the distance between two consecutive take-up means in the strip-like element. Since one or some windings have a smaller pitch than the distance between two consecutive take-up means of the strip, such a friction is obtained that the spring cannot loosen itself anymore due to vibration. Moreover, the advantage is obtained that each spring is clamped with substantially the same friction on the strip and independent of the distance over which it has been screwed on the strip. This results from the fact that if more windings than those of the smaller pitch are screwed on the strip, these additional windings do not or hardly contribute to the increase of the friction. By means of tests it can be determined what friction the springs should have on the strips.

A preferred embodiment of the suspension device according to the invention is characterized in that the end of the spring portion engaging with the recesses has a thickened head. By rounding off the end of said thickened portion it will be possible, without the necessity of exercizing a too great force, to move said end easily in the take-up means, whilst at its other end the thickened portion requires only a small flattening in order to be able to function as a satisfactory abutment, since on the end of the spring a force is exerted which is directed towards the lower end of the strip-like element. In consequence thereof it is possible to screw back the spring when it has been screwed too far on the strip-like element. Such a thickened portion may be easily obtained by bending the end of the spring so far back that this bent end lies against the spring winding.

In consequence of the fact that the spring is always located with substantially the same friction on the strip, the force required for screwing the spring on said strip is always substantially the same. As a result thereof it is possible to construct the suspension device in such manner that the end of the spring remote from the portion engaging with the recesses is bent into a hook, said bent end engaging with a small plate, said plate having a small portion which is passed through an opening of the ceiling carrier in which it may turn. This small plate does not serve only as a fastening means for the spring to the ceiling carrier but also as an operating means for screwing the spring. An additional advantage of this suspension device is that the small plate cannot loosen itself by vibration.

The invention will be explained below with reference to the accompanying drawings showing by way of example an embodiment of a suspension device according to the invention.

Figure 1:
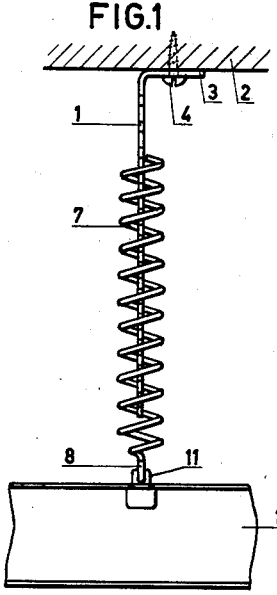
FIG. 1 shows a front view of a suspension device fastened to a beam and supporting a ceiling carrier.
Figure 2:
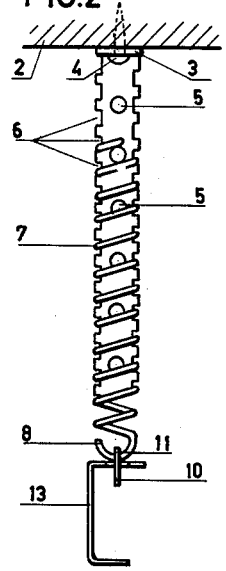
FIG. 2 is a side view thereof.
Figure 3:
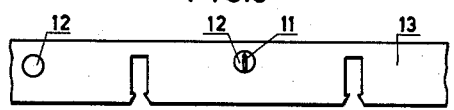
FIG. 3 is a top plan view of a ceiling carrier with a small operating and fastening plate for the spring provided therein.
Figure 4:
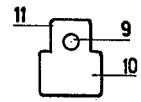
FIG. 4 shows the small operating and fastening plate for the spring in front view.

In the embodiment shown in FIGS. 1–4 a strip-like element 1 is fixed to a joist 2. For this purpose the end 3 of this element 1 has been bent at right angles and a fastening screw 4 has been screwed through a hole of this rectangularly bent part. In the element 1 there are provided a number of holes 5 spaced apart at a given distance. Consequently element 1 may be cut off from a long strip at the required length and may be so bent at one end that there is always at least one fastening hole 5 available for a screw 4.

The strip-like element 1 has at both longitudinal edges a plurality of rectangular recesses 6 which are in engagement with a helically wound spring 7. The lower end of said spring 7 has been bent into a hook 8. This hook engages with a hole 9 of a small plate 10, said plate having a narrow portion 11. This narrow portion 11 is passed through an opening 12 of a ceiling carrier 13. The wider portion of the small plate 10 abuts against an inner side of said ceiling carrier 13. The height of said ceiling carrier may be adjusted by screwing the spring 7 farther or less far on the strip-like element 1.

Figure 5:
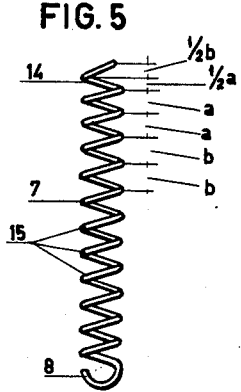
FIGS. 5 and 6 show two embodiments of the spring.
Figure 6:
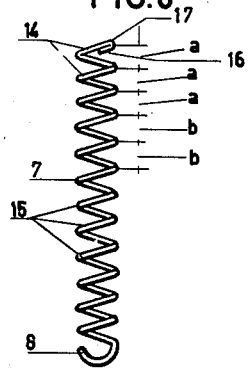

In order to prevent the spring 7 from turning as a result of vibrations or shocks suffered by the strip-like element, the two upper windings 14 have, as is apparent from FIGS. 5 and 6, a pitch $a$ which is smaller than the pitch $b$ of the other windings 15. The pitch $b$ is substantially equal to the distance between two consecutive recesses 6 on the same side of the strip-like element 1. If the spring 7 is turned on the strip-like element 1 the two windings 14 with the small pitch $a$ are given the pitch $b$ so that consequently these windings 14 are firmly pressed against the lower sides of the recesses 6. In consequence of the fact that only two windings have a smaller pitch the force required for screwing the spring will or will not hardly increase if more windings of the spring are turned on the strip-like element 1.

In the case of the spring according to FIG. 6 the end of the last winding 14 has been bent. As a consequence thereof, when screwing back the spring, the rear end 16 of this bent portion will abut against the strip-like element 1 thus ensuring that in the case of heavy shocks the spring 7 cannot loosen itself any farther. However, this bent portion does not prevent the spring from being screwed back if by means of a tool the small plate 10 is turned, since in doing so a much greater force may be exercized then the force which may occur on account of vibrations or shocks in a ceiling. The front end 17 of the bent portion is somewhat round so that it may be easily moved in the recesses 6.

It is obvious that the invention is not restricted to the embodiments described above and shown in the drawings, and that also strip-like elements with differently shaped take-up means such as holes or apertures may be applied and that the end projecting beyond the strip-like element 1 may also be fastened in a different manner to a ceiling carrier.

In order to be able to screw the spring 7 easily on the strip-like element 1 the initial end of the portion of the spring in engagement with the recesses may have a pitch which substantially corresponds with the distance between two recesses of the strip-like element lying in the same row. The end of the spring may also be bent upwards in an oblique position.

I claim:

1. A suspension device for a ceiling carrier, said carrier being adapted to carry panels of a ceiling, in particular of an acoustic ceiling, said device comprising a strip-like element provided with two longitudinal rows of take-up means, said take-up means being located in spaced relation, a helical spring fitting in said take-up means and having a free end and means provided to fix the carrier to the free end of the helical spring, at least one of the windings of said helical spring having a smaller pitch than the pitch of the other windings, the pitch of said other windings substantially corresponding with the distance between two consecutive take-up means in the strip-like element.

2. A suspension device according to claim 1, characterized in that the end of the helical spring engaging with the take-up means has a thickened head.

3. A suspension device according to claim 1, characterized in that the end of the helical spring remote from its portion engaging with the take-up means is bent into a hook, said hook engaging with a plate, said plate having a small portion which is passed through an opening of the ceiling carrier in which it may turn.

4. A suspension device for a ceiling carrier, said carrier being adapted to carry panels of a ceiling, in particular of an acoustic ceiling, said device comprising a strip-like element provided with two longitudinal rows of take-up means, said take-up means being located in spaced relation, a helical spring fitting in said take-up means and having a free end and means provided to fix the carrier to the free end of the helical spring, the initial portion of the spring having a pitch which substantially corresponds with the distance between two take-up means of the strip-like element lying in the same row, said initial portion being followed by at least one winding of said helical spring having a smaller pitch than the pitch of the other windings, the pitch of said other windings substantially corresponding with the distance between two consecutive take-up means in the strip-like element.

References Cited in the file of this patent

UNITED STATES PATENTS

| 190,061 | Middleton | Apr. 24, 1877 |
| 210,027 | Hansell | Nov. 19, 1878 |
| 1,893,537 | Cruze | Jan. 10, 1933 |
| 2,050,559 | Budnick | Aug. 11, 1936 |
| 2,702,082 | Wolf | Feb. 15, 1955 |
| 3,058,705 | Hagg et al. | Oct. 16, 1962 |

FOREIGN PATENTS

| 874 | Great Britain | Jan. 19, 1915 |